Dec. 15, 1931.  M. F. THAU  1,836,827
COOKER
Filed Oct. 27, 1930   2 Sheets-Sheet 1
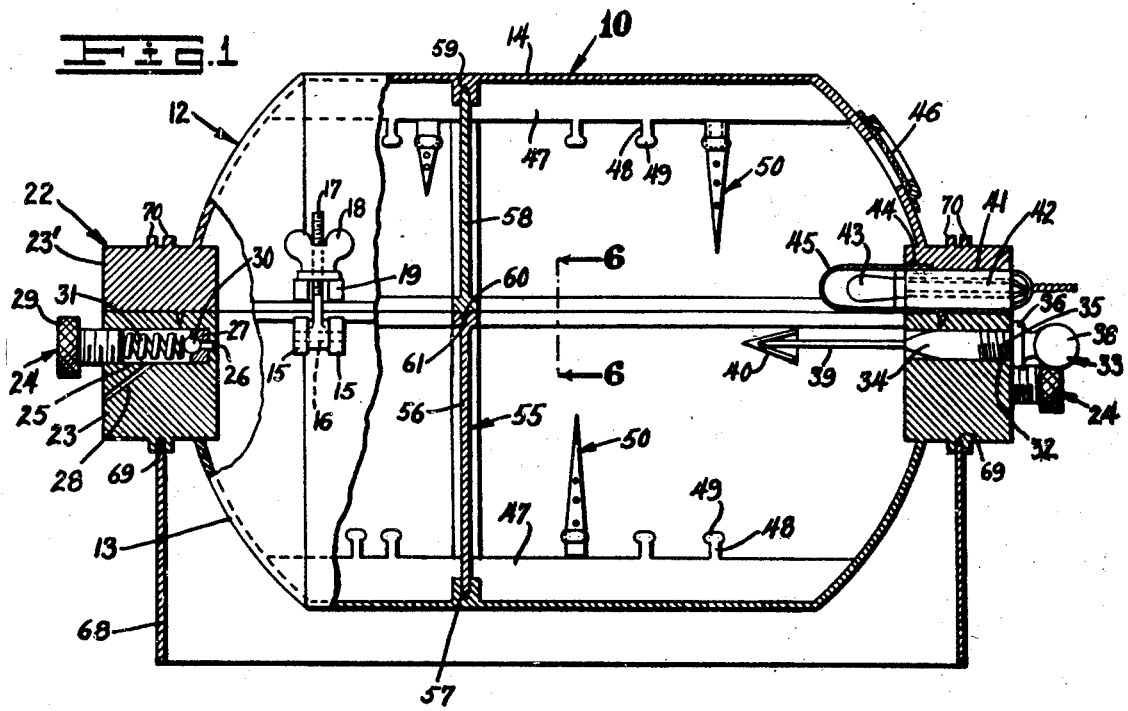
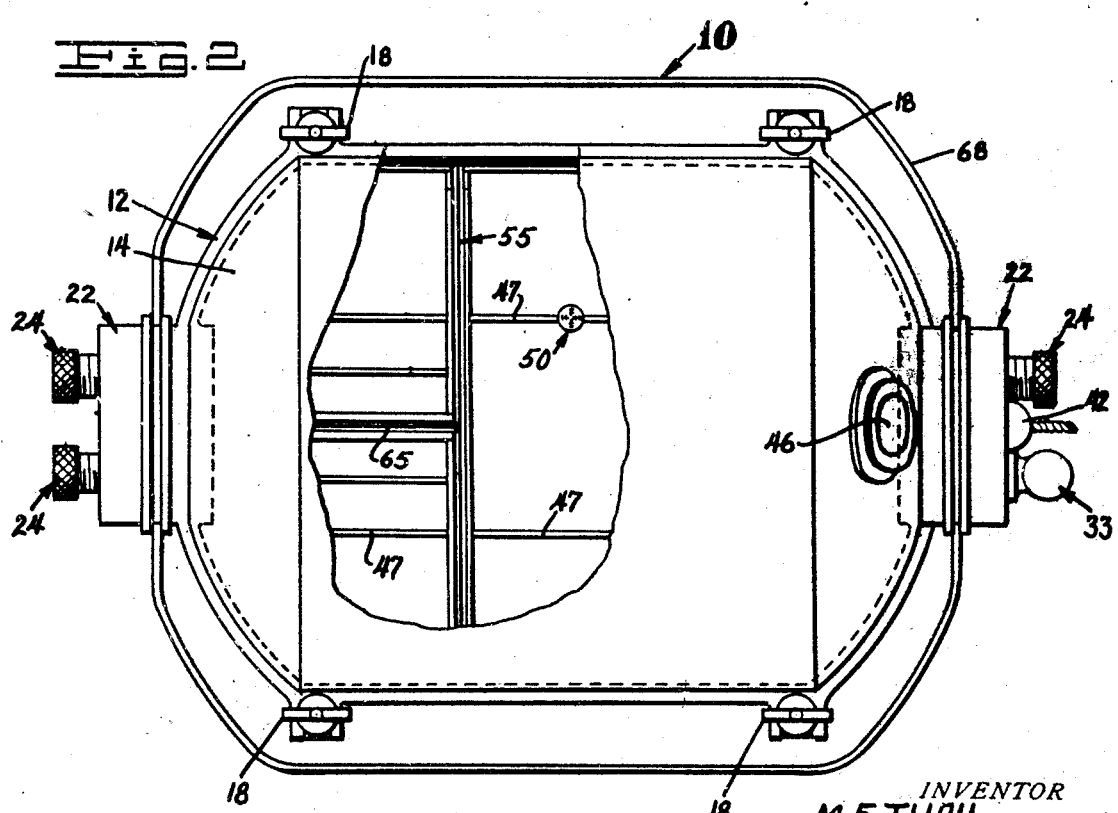
INVENTOR
M. F. THAU.
BY
B. J. Craig
ATTORNEY

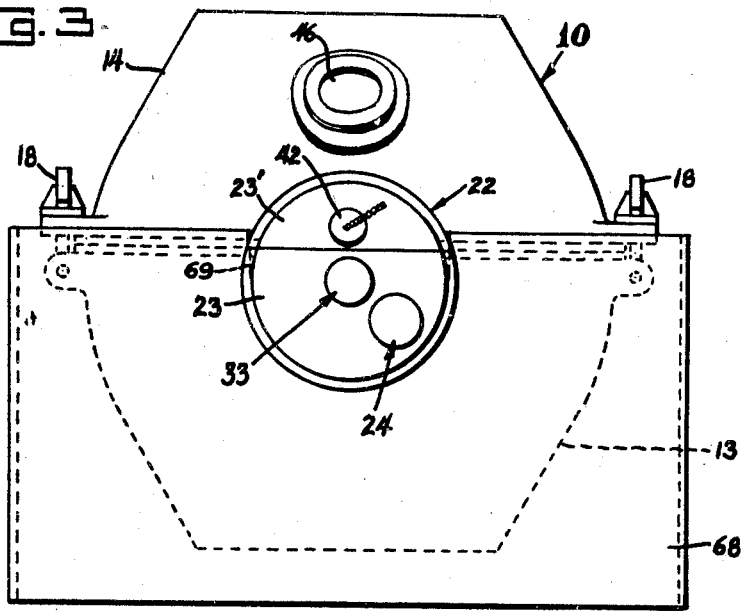
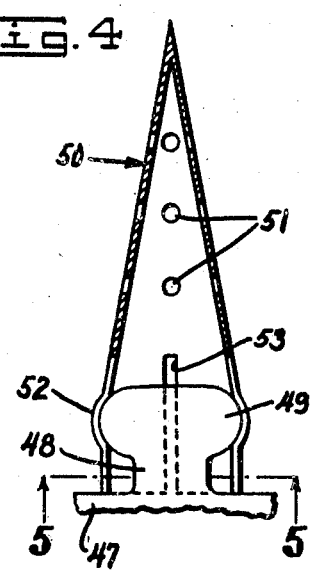
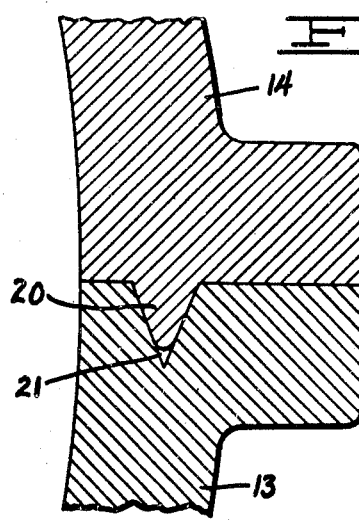
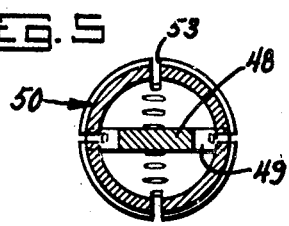
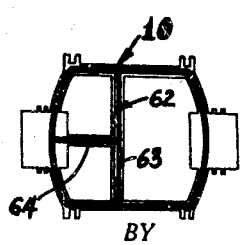

Patented Dec. 15, 1931

1,836,827

UNITED STATES PATENT OFFICE

MAX F. THAU, OF LOS ANGELES, CALIFORNIA

COOKER

Application filed October 27, 1930. Serial No. 491,462.

This invention relates to improvements in cookers.

The general object of the invention is to provide an improved self-basting cooker.

Another object of the invention is to provide an improved cooker containing a plurality of individual compartments.

A further object of the invention is to provide an improved pressure cooking roaster.

A still further object of the invention is to provide an improved meat holding spike for use in a cooker.

Other objects and the advantages of this invention will be apparent from the following description taken in connection with the accompanying drawings wherein:

Fig. 1 is a side view of my improved cooker with parts broken away to more clearly illustrate the same.

Fig. 2 is a top plan view of the cooker with parts thereof broken away.

Fig. 3 is an end view of the cooker.

Fig. 4 is an enlarged central section through one of my improved meat holding spikes.

Fig. 5 is a section taken on line 5—5 of Fig. 4.

Fig. 6 is an enlarged section taken on line 6—6 of Fig. 2, and

Fig. 7 is a top plan view on a reduced scale with the lid removed showing another form of partition.

Referring to the drawings by reference characters I have indicated my improved cooker generally at 10.

As shown this cooker comprises a container 12 which includes a bottom member 13 and a top member or lid 14. Secured to the bottom member 13 I provide a plurality of pairs of spaced bearings 15 between each pair of which I pivotally mount as at 16 a threaded stem 17 having a wing nut 18 thereon.

The top member or lid 14 is provided with a plurality of pairs of lugs 19 to match the bearings 15. To secure the lid 14 to the bottom member 13 the stems 17 are positioned between the lugs 19 of the lid and the wing nuts 18 are moved into engagement with the lugs 19 and tightened.

To secure a tight connection between the bottom member 13 and the lid 14 I provide on the underface of the top member a downwardly extending circumferential rib 20 which is substantially triangular in cross section and which fits in a circumferential groove 21 of similar cross section in the upper face of the bottom member (see Fig. 6).

Secured to each end of the container 12 as by welding I provide a trunnion 22 each of which includes a lower section 23 secured to the bottom member 13 and an upper section 23' secured to the lid 14.

In the lower portion 23 of one of the trunnions I provide a pair of relief valves 24 which comprise a pair of spaced recesses 25 which are threaded adjacent the outer end and extending from the apertures 25 through the trunnion to the interior of the container I provide a reduced aperture 26. At the inner end of the recess 25 I provide a ball valve seat 27 which includes an aperture communicating with the reduced aperture 26.

Extending through the lower portion 23 of the trunnion from each of the recesses 25 I provide an aperture 28. For closing the outer ends of the apertures 25 I provide threaded plugs 29 which engage the threaded portions of the recesses 25. Within each of the recesses 25 I provide a ball valve 30 which is adapted to be normally urged into engagement with the valve seat 27 by a coiled spring 31, one end of which engages the ball and the opposite end the inner end of the plug 29.

In the lower portion of the other trunnion I provide a relief valve 24 and an aperture 32 which is threaded adjacent its outer end. Adapted to be positioned in the aperture 32 I provide a tester 33 which includes a hub 34 having a threaded portion 35 adjacent one end which is adapted to engage the threaded portion of the aperture 32. On the outer end of the hub I provide an enlarged head 36 which includes a thumb wing 38 and extending from the opposite end of the hub I provide a reduced shank 39 having a hollow cone 40 secured to the end thereof. In the upper portion 23' of this trunnion I provide an aperture 41 in which an electric bulb socket device 42 is positioned, in which an electric bulb 43 is adapted to be positioned. The inner end of the aperture 41 is preferably threaded as at 44 and a translucent cap 45 which covers the bulb 43 is secured to the threaded portion 44.

Directly above the bulb 43 in the lid 14 I provide a pyrex window 46 through which the contents of the container may be viewed.

Extending longitudinally of the bottom member 13 and the lid 14 I provide a plurality of ribs 47. Extending beyond the edge of the ribs 47 I provide fingers 48 having enlarged heads 49 thereon.

Adapted to be positiond on the fingers 48 I provide hollow cone shaped meat holding spikes 50. Each of the cone spikes 50 are provided with a plurality of apertures 51 and a bulbous portion 52 which on the interior is the same diameter as of the width of the heads 49 of the finger 48. The diameter of the portion of the cone below the bulbous portion 52 is smaller than the length of the head 49 and the cone is split as at 53 to allow each cone to be snapped over the head.

For dividing the container 12 into a plurality of separate compartments so that different foods may be cooked at the same time I provide a transverse partition 55. This partition includes a lower portion 56 which fits in a groove 57 provided in a flange in the lower portion 13 and an upper portion 58 which fits in a groove 59 in a flange in the upper portion 14. The lower edge of the upper portion 58 of the partition is provided with a V shaped ridge 60 which is adapted to be positioned in a similarly shaped groove 61 in the upper edge of the lower section 56 of the partition.

As shown in Fig. 7 a partition 62 which divides the container into three compartments may be placed in the container. This partition includes a transverse section 62 similar to the partition 55 and a longitudinal section 64 which is located between the pair of spaced relief valves 24. The partition 62 is divided into an upper and a lower section and tongued and grooved together similar to the partition 55 and the longitudinal portion 64 of the partition 62 fits into a groove 65 in the lower portion 13 and a groove 66 in the upper portion 14.

For supporting the container 12 over a fire I provide a stand 68 which includes opposed slots 69 in which the beads 70 of the trunnions 22 are positioned.

When it is desired to cook a roast in the cooker 10 the lid 14 is removed and the tester 33 is withdrawn. One or more of the cone spikes 50 are placed in position on the fingers 48 of the lower section and then the meat is placed in the lower section 13 resting on the ribs 47 with the spikes 49 projecting into the meat. The tester 33 is then replaced in the trunnion with the hollow cone 40 projecting into the meat. A plurality of the cone spikes 50 are then placed in position on the fingers 48 of the lid 14 and the lid is placed on the bottom member 13 and secured thereto by the stems 17 and nuts 18 as previously described, after which the container 12 is operatively positioned on the stand 68 and the entire device set over a fire or in an oven.

During the cooking of the meat the container 12 is rotated on the trunnions periodically and as it is so rotated the juices from the meat which have collected in the bottom of the container will be carried upward by the ribs 47 and discharged over the meat, thus it will be seen that each time the container is rotated the meat therein will be automatically basted.

As the juices are carried upward some of it will flow into the hollow cone spikes 50 and thence out through the apertures 51 into the meat thus carrying the juice to the interior of the meat.

When the lid 14 is tightly clamped to the bottom member 13 the steam from the meat juices therein cannot escape except by unseating the ball valves 30 of the relief valves 24. The pressure desired in the container may be regulated by adjusting the threaded plugs 29, which will increase or decrease the tension of the springs 31 depending in which direction the plugs are moved. It will thus be seen that the contents of the container is also pressure cooked.

When it is desired to test the roast the operator unscrews the tester 33 and pulls it outward. The operator can tell by the pull on the tester the state of the roast and should it not be done the operator would not pull the tester all the way out. When the operator judges the roast to be nearly done he may pull the tester all the way out. When this is done the hollow of the cone 40 will be filled with meat and the operator may inspect and taste it to determine the condition of the meat.

When the transverse partition 55 is positioned in the container meat may be cooked in the compartment containing the tester and vegetables or some other food may be cooked in the other compartment. When this is done the steam from the meat juices escapes through the relief valve 24 adjacent the tester and the steam created in the other compartment escapes through one or both of the pair of relief valves 24 in the opposite trunnion.

When the partition 62 is positioned in the container three different compartments are formed and a different article may be cooked in each compartment. When this partition is in position the steam created on one side of the longitudinal partition 64 escapes through one of the pair of relief valves 24 and the steam created on the other side of the longitudinal partition 62 escapes through the other of the pair of relief valves.

By providing the light 43 the interior of the container is illuminated so that the operator can view the roast to determine the state thereof during the cooking process.

From the foregoing description it will be apparent that I have provided a novel cooking vessel which is simple in construction and efficient in use.

Having thus described my invention, what I claim is:

1. In a cooking device, a container including a bottom member and a lid member, releasable means to secure said lid to said bottom member, an upstanding finger in one of said members, said finger including a head, a hollow cone spike, said spike including a portion engaging said finger, said cone including means whereby it may be held on said finger there being a plurality of apertures in said cone.

2. In a cooking device, a container including a bottom member and a lid, releasable means to secure said lid to said bottom member, an upstanding rib adjacent the bottom of said bottom member, an upstanding finger on said rib, said finger being flat and including an enlarged head, a hollow cone spike, said spike including a bulbous portion the inside diameter of which is approximately the same as the length of said head, the portion of said cone below said bulbous portion being of less diameter than the length of said head, said cone including means whereby it may be positioned on said finger with said finger head positioned in said bulbous portion there being a plurality of apertures in said cone.

3. In a cooking device, a container, an upstanding rib adjacent the bottom of said container, an upstanding finger on said rib, said finger including an enlarged head, a hollow cone spike, said spike including a bulbous portion the inside diameter of which is approximately the same as the length of said head, the portion of said cone below said bulbous portion being of less diameter than the length of said head, said cone including means whereby it may be positioned on said finger with said finger head positioned in said bulbous portion, there being a plurality of apertures in said cone.

In testimony whereof, I hereunto affix my signature.

MAX F. THAU.